US010464666B2

(12) United States Patent
Laitenberger et al.

(10) Patent No.: US 10,464,666 B2
(45) Date of Patent: Nov. 5, 2019

(54) COMPOSITE REINFORCED SWASHPLATE

(71) Applicant: Sikorsky Aircraft Corporation, Stratford, CT (US)

(72) Inventors: Kevin Laitenberger, Beacon Falls, CT (US); Stephen V. Poulin, Milford, CT (US); Erik Byrne, West Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 204 days.

(21) Appl. No.: 15/527,760

(22) PCT Filed: Sep. 18, 2015

(86) PCT No.: PCT/US2015/050858
§ 371 (c)(1),
(2) Date: May 18, 2017

(87) PCT Pub. No.: WO2016/081057
PCT Pub. Date: May 26, 2016

(65) Prior Publication Data
US 2017/0327217 A1    Nov. 16, 2017

Related U.S. Application Data

(60) Provisional application No. 62/082,412, filed on Nov. 20, 2014.

(51) Int. Cl.
*B64C 27/605*    (2006.01)
*B64C 27/10*    (2006.01)

(52) U.S. Cl.
CPC ............ *B64C 27/605* (2013.01); *B64C 27/10* (2013.01)

(58) Field of Classification Search
CPC .................................................... B64C 27/605
See application file for complete search history.

(56) References Cited

U.S. PATENT DOCUMENTS 3,841,586 A * 10/1974 Broadley .............. B64C 27/605
244/17.25
4,425,082 A *  1/1984 Mussi ..................... B64C 27/32
416/134 A (Continued)

FOREIGN PATENT DOCUMENTS

EP        0452248 A2   10/1991
FR         398545 A     6/1909

OTHER PUBLICATIONS

Notification of Transmittal of the International Search Report for Interantional Application No. PCT/US15/50858 dated Feb. 29, 2016; dated Mar. 11, 2016; pp. 1-7.

(Continued)

*Primary Examiner* — Justin D Seabe
*Assistant Examiner* — Brian Christopher Delrue
(74) *Attorney, Agent, or Firm* — Cantor Colburn LLP

(57) ABSTRACT

A swashplate of a blade pitch control assembly is provided including a metal component having one or more interfacing features. The metal component includes a hollow first cylinder having a first flange extending outwardly from a first end thereof and a second flange extending outwardly from a second end thereof. A sidewall extends between the first and second flanges such that a cavity is defined between the first flange, the second flange, and the sidewall. A plurality of connecting members is connected to a portion of the first flange and the second flange and is spaced about a periphery of the first cylinder. A tubular composite component is arranged at least partially within the cavity between adjacent pairs of the connecting members.

15 Claims, 7 Drawing Sheets

(56) References Cited

U.S. PATENT DOCUMENTS

| | | | | |
|---|---|---|---|---|
| 4,473,335 | A * | 9/1984 | Henry | B64C 27/18 416/148 |
| 4,521,157 | A * | 6/1985 | Caramaschi | B64C 27/32 416/134 A |
| 4,688,993 | A * | 8/1987 | Ferris | B64C 27/605 416/114 |
| 4,797,064 | A * | 1/1989 | Ferris | B64C 27/32 416/134 A |
| 4,804,315 | A * | 2/1989 | Ferris | B64C 27/605 416/114 |
| 4,930,983 | A * | 6/1990 | Byrnes | B29C 70/887 416/134 A |
| 5,071,319 | A * | 12/1991 | McCafferty | B64C 27/605 416/134 A |
| 5,074,494 | A * | 12/1991 | Doolin | B64C 27/605 244/17.25 |
| 5,199,849 | A * | 4/1993 | Leman | B64C 27/605 416/114 |
| 5,240,661 | A * | 8/1993 | Parker | B29C 33/76 264/103 |
| 5,810,562 | A * | 9/1998 | Byrnes | B64C 27/605 416/114 |
| 7,201,561 | B2 * | 4/2007 | Parsons | B64C 27/605 415/174.2 |
| 8,142,158 | B2 * | 3/2012 | Schmaling | B64C 27/605 416/149 |
| 9,718,541 | B2 * | 8/2017 | Darrow, Jr. | B64C 27/605 |
| 2004/0126238 | A1 * | 7/2004 | Scala | B64C 27/605 416/98 |
| 2006/0275120 | A1 * | 12/2006 | Parsons | B64C 27/605 416/114 |
| 2007/0128037 | A1 * | 6/2007 | Schmaling | B64C 27/605 416/134 A |
| 2009/0220341 | A1 * | 9/2009 | Schmaling | B64C 27/10 416/114 |
| 2013/0105636 | A1 * | 5/2013 | Day | B64C 27/605 244/7 A |
| 2013/0149150 | A1 * | 6/2013 | Wiinikka | B64C 27/605 416/114 |
| 2013/0240663 | A1 * | 9/2013 | Lohr | A63H 27/12 244/17.25 |
| 2018/0290740 | A1 * | 10/2018 | Darrow, Jr. | B64C 27/10 |
| 2019/0017543 | A1 * | 1/2019 | Shimek | F16C 27/063 |

OTHER PUBLICATIONS

Written Opinion of the International Searching Authority for Interantional Application No. PCT/US15/50858 dated Feb. 29, 2016; dated Mar. 11, 2016; pp. 1-5.

Extended European Search Report; European Application No. 15861886.8; dated Aug. 2, 2018; 6 Pages.

* cited by examiner

COMPOSITE REINFORCED SWASHPLATE

CROSS REFERENCE TO RELATED APPLICATIONS

This application is a National Stage application of PCT/US2015/050858, filed Sep. 18, 2015, which claims the benefit of U.S. Provisional Application No.: 62/082,412, filed Nov. 20, 2014, both of which are incorporated by reference in their entirety herein.

FEDERAL RESEARCH STATEMENT

This invention was made with government support under contract number No. W911W6-13-2-0003 awarded by the Army. The government has certain rights in the invention.

BACKGROUND OF THE INVENTION

Exemplary embodiments of the invention relate to a rotary wing aircraft, and more particularly, to an assembly for controlling rotor blade pitch of a rotary wing aircraft rotor system.

Control of a rotary wing aircraft is affected by varying the pitch of the rotor blades individually as the rotor rotates, and by varying the pitch of all of the blades together. These are known respectively as cyclic and collective pitch control. Blade pitch control of a rotary wing aircraft main rotor is typically achieved through a swashplate.

The swashplate is typically concentrically mounted about the rotor shaft. The swashplate generally includes two rings connected by a series of bearings with one ring connected to the airframe (stationary swashplate) and the other ring connected to the rotor hub (rotating swashplate). The rotating ring is connected to the rotor hub through a pivoted link device typically referred to as scissors, with the static ring similarly connected to the airframe. The rotating swashplate rotates relative to the stationary swashplate. Apart from rotary motion, the stationary and rotating swashplate otherwise move as a unitary component. Cyclic control is achieved by tilting the swashplate relative to a rotor shaft and collective control is achieved by translating the swashplate along the rotor shaft.

Pitch control rods mounted between the main rotor blades and the rotating swashplate transfer loads between the swashplate and the main rotor blades. Main rotor servos extend between and attach to the stationary swashplate and the aircraft fuselage. Displacement of the main rotor servos results in displacement of the stationary swashplate. Hence, by actuating selected main rotor servos, collective and cyclic commands are transferred to the rotor head as vertical and/or tilting displacement of the swashplates.

Deflection of a swashplate can cause pitch loss at the blades and increased stress in the duplex bearing. To avoid this deflection, swashplates are designed to have a high stiffness, typically by increasing the cross-section of the component; however increasing the cross-section of the swashplate adds weight to the rotary wing aircraft. Although current swashplates perform adequately, it is always desirable to reduce the empty weight of the helicopter. One consideration for decreasing the empty weight of the helicopter is to use a composite material to replace metal components. However, the typical configuration of a swashplate requires tightly toleranced surfaces and interface geometry that are difficult to obtain using composite materials while still maintaining the necessary high strength and acceptable life of the swashplate.

BRIEF DESCRIPTION OF THE INVENTION

According to one embodiment of the invention, a swashplate of a blade pitch control assembly is provided including a metal component having one or more interfacing features. The metal component includes a hollow first cylinder having a first flange extending outwardly from a first end thereof and a second flange extending outwardly from a second end thereof. A sidewall extends between the first and second flanges such that a cavity is defined between the first flange, the second flange, and the sidewall. A plurality of connecting members is connected to a portion of the first flange and the second flange and is spaced about a periphery of the first cylinder. A tubular composite component is arranged at least partially within the cavity between adjacent pairs of the connecting members.

In addition to one or more of the features described above, or as an alternative, in further embodiments the swashplate is stationary.

In addition to one or more of the features described above, or as an alternative, in further embodiments the swashplate is configured to couple to a rotor shaft rotatable about an axis, and the swashplate rotates with the rotor shaft about the axis.

In addition to one or more of the features described above, or as an alternative, in further embodiments the composite component includes one or more layers of fiberglass or graphite fibers.

In addition to one or more of the features described above, or as an alternative, in further embodiments the composite component includes a plurality of separate sections. Each section is mounted between adjacent connecting members.

In addition to one or more of the features described above, or as an alternative, in further embodiments the plurality of sections of the composite component are substantially identical.

In addition to one or more of the features described above, or as an alternative, in further embodiments at least one section of the plurality of sections is different from a remainder of the plurality of sections.

In addition to one or more of the features described above, or as an alternative, in further embodiments the composite component has a rectangular cross-section.

In addition to one or more of the features described above, or as an alternative, in further embodiments a hollow interior of the first cylinder is configured to receive a rotatable shaft therein.

In addition to one or more of the features described above, or as an alternative, in further embodiments the plurality of connecting members extend outwardly from the first cylinder at an angle.

In addition to one or more of the features described above, or as an alternative, in further embodiments the metal component further comprises a hollow second cylinder arranged concentrically within a hollow interior of the first cylinder. The second cylinder has an outer diameter smaller than an inner diameter of the first cylinder such that a gap is defined between the outer cylinder and the inner cylinder.

In addition to one or more of the features described above, or as an alternative, in further embodiments a web extends between the second end of the first cylinder and an adjacent end of the second cylinder.

In addition to one or more of the features described above, or as an alternative, in further embodiments the web is integrally formed with one or both of the second flange of the first cylinder and the adjacent end of the second cylinder. The web is formed from a metal material.

In addition to one or more of the features described above, or as an alternative, in further embodiments the web comprises a composite material.

According to another embodiment of the invention, a rotary wing aircraft is provided including a main rotor system having a rotor shaft configured to rotate about an axis and a rotor hub having a plurality of rotor blades mounted thereto connected to the rotor shaft and configured to rotate therewith. A blade pitch control assembly is configured to move each of the plurality of rotor blades about a pitch axis. The blade pitch control assembly includes a swashplate linked to the main rotor system. The swashplate has a metal component with one or more interfacing features. The metal component includes a hollow first cylinder having a first flange extending outwardly from a first end thereof and a second flange extending outwardly from a second end thereof. A sidewall extends between the first and second flanges such that a cavity is defined between the first flange, the second flange, and the sidewall. A plurality of connecting members is connected to a portion of the first flange and the second flange and is spaced about a periphery of the first cylinder. A tubular composite component is arranged at least partially within the cavity between adjacent pairs of the connecting members.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
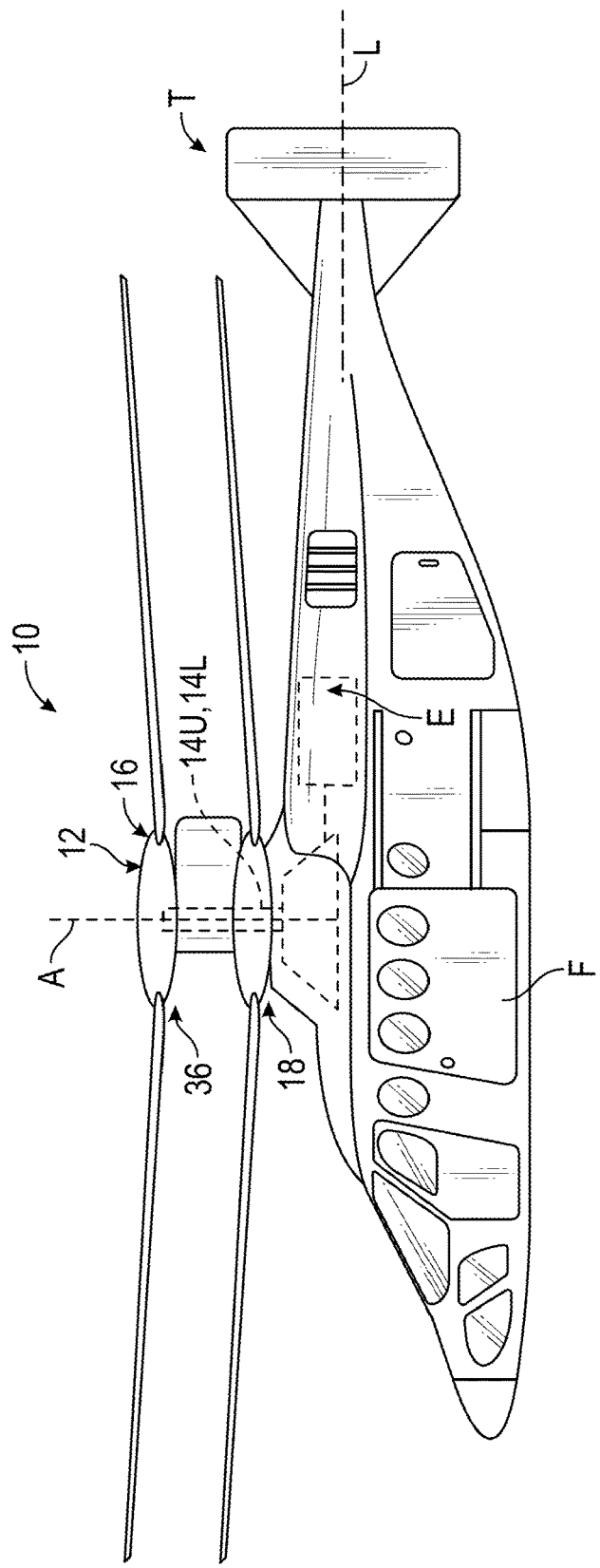
FIG. 1 is a perspective view of an example of a rotary wing aircraft.

FIG. 1 illustrates an exemplary vertical takeoff and landing (VTOL) rotary wing aircraft 10 having a dual, counter-rotating, coaxial rotor system 12, which rotates about a rotating main rotor shaft 14U, and a counter-rotating main rotor shaft 14L (FIG. 2), both about an axis of rotation A. The aircraft 10 includes an airframe F which supports the dual, counter-rotating, coaxial rotor system 12 as well as an optional translational thrust system T which provides translational thrust during high speed forward flight generally parallel to an aircraft longitudinal axis L. Although a particular aircraft configuration is illustrated in the disclosed embodiment, other counter-rotating, coaxial rotor systems, as well as other rotor systems and types of aircraft, such as tilt-wing and tilt-rotor aircraft for example, will also benefit from the present invention.

A main gearbox G (FIG. 2) which may be located above the aircraft cabin drives the rotor system 12. The translational thrust system T may be driven by the same main gearbox G which drives the rotor system 12. The main gearbox G is driven by one or more engines (illustrated schematically at E). As shown, the main gearbox G may be interposed between the gas turbine engines E, the rotor system 12, and the translational thrust system.

Figure 2:
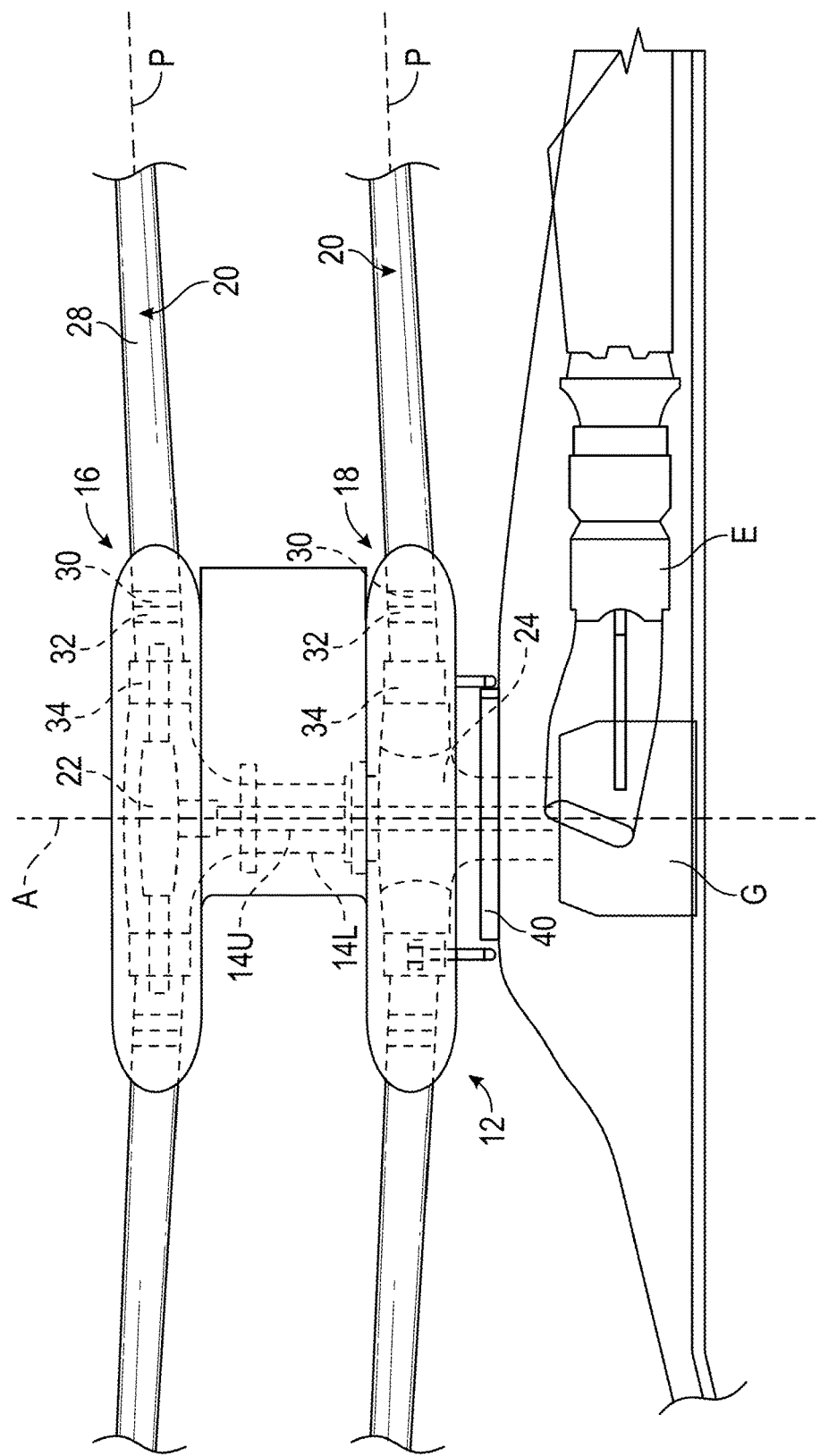
FIG. 2 is detailed view of the main rotor system of the rotary wing aircraft of FIG. 1.

Referring to FIG. 2, the dual, counter-rotating, coaxial rotor system 12 includes an upper rotor system 16 and a lower rotor system 18. Each rotor system 16, 18 includes a plurality of rotor blade assemblies 20 mounted to a rotor hub assembly 22, 24 for rotation about the rotor axis of rotation A. The rotor hub assembly 22 is mounted to the upper rotor shaft 14U which counter rotates within the lower rotor shaft 14L which rotates the lower hub assembly 24.

The plurality of main rotor blade assemblies 20 project substantially radially outward from the hub assemblies 22. 24. Any number of main rotor blade assemblies 20 may be used with the rotor system 12. Each rotor blade assembly 20 of the rotor system 12 generally includes a rotor blade 28 (illustrated somewhat schematically, a rotor blade spindle 30, and a rotor bearing 32 which support the rotor blade spindle 30 within a bearing housing 34 to permit the rotor blade 28 to pitch about a pitching axis P. It should be understood that various blade attachments may also be utilized with the present invention.

Figure 3:
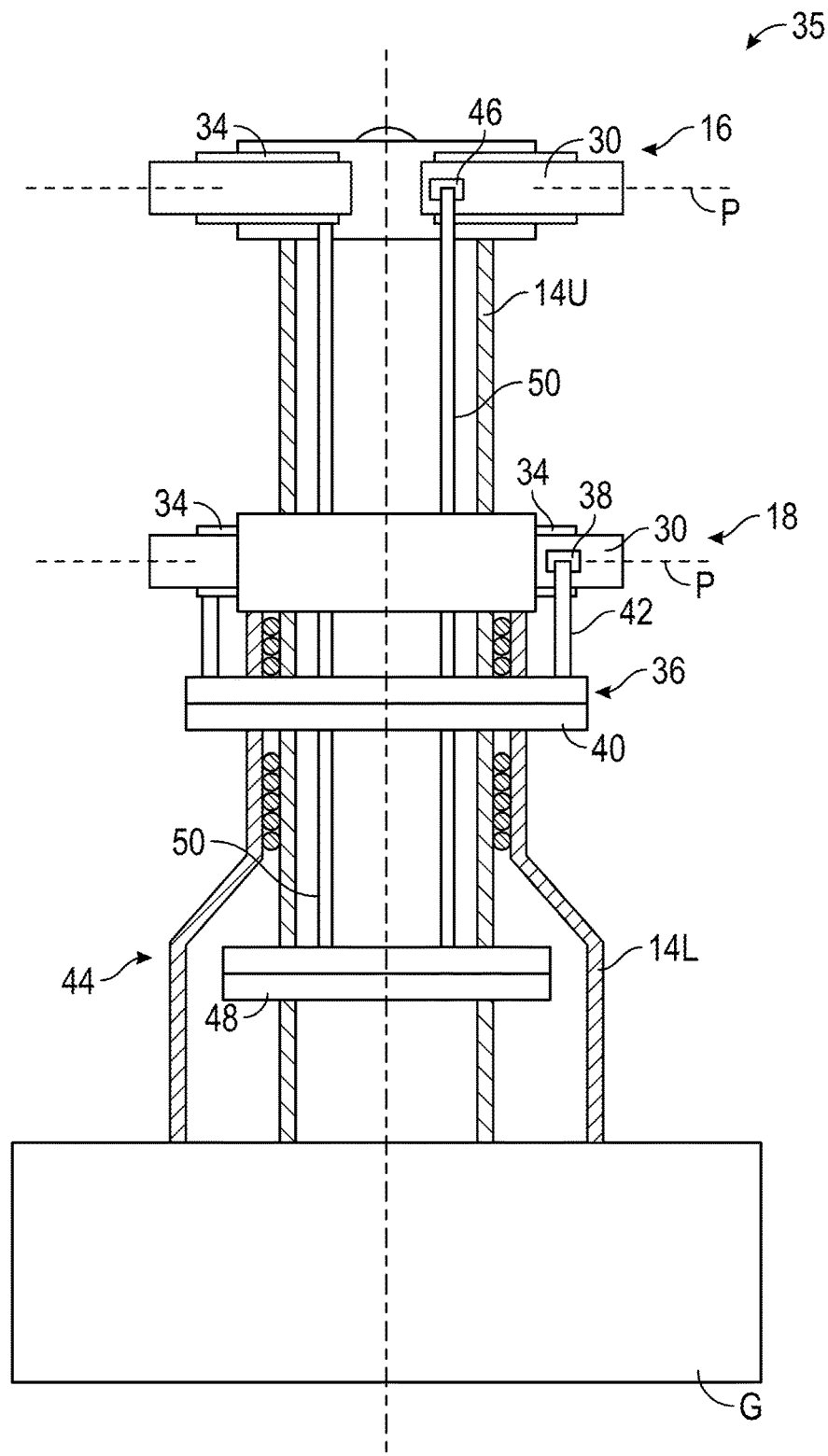
FIG. 3 is a detailed side view a blade pitch control assembly of the main rotor system of FIG. 2.
Figure 4:
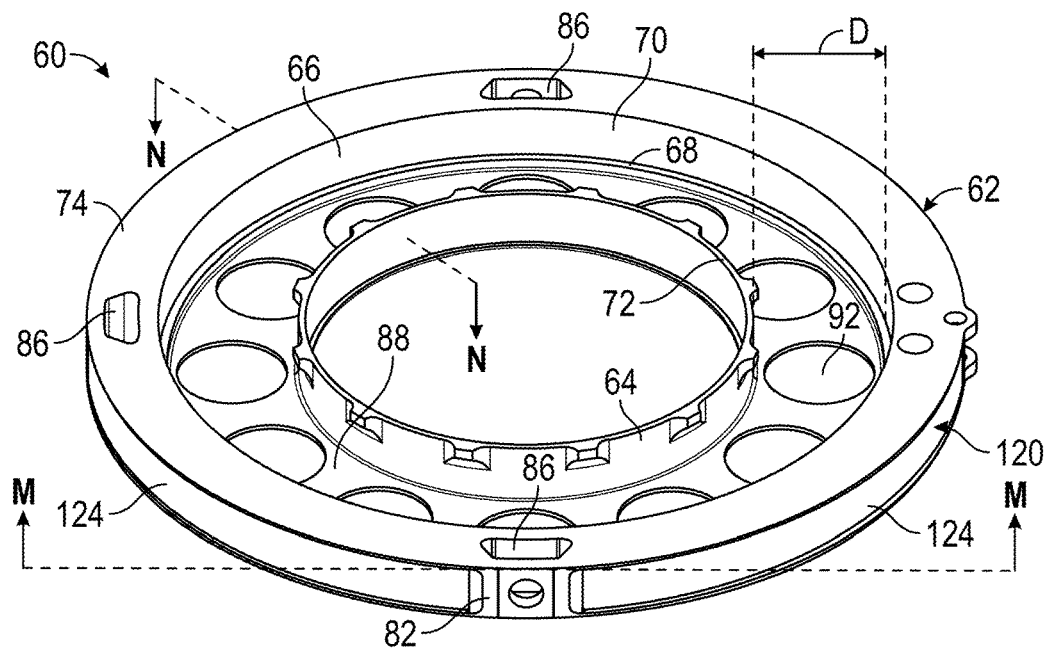
FIG. 4 is a perspective view of a swashplate of the blade pitch control assembly according to an embodiment of the invention.
Figure 5:
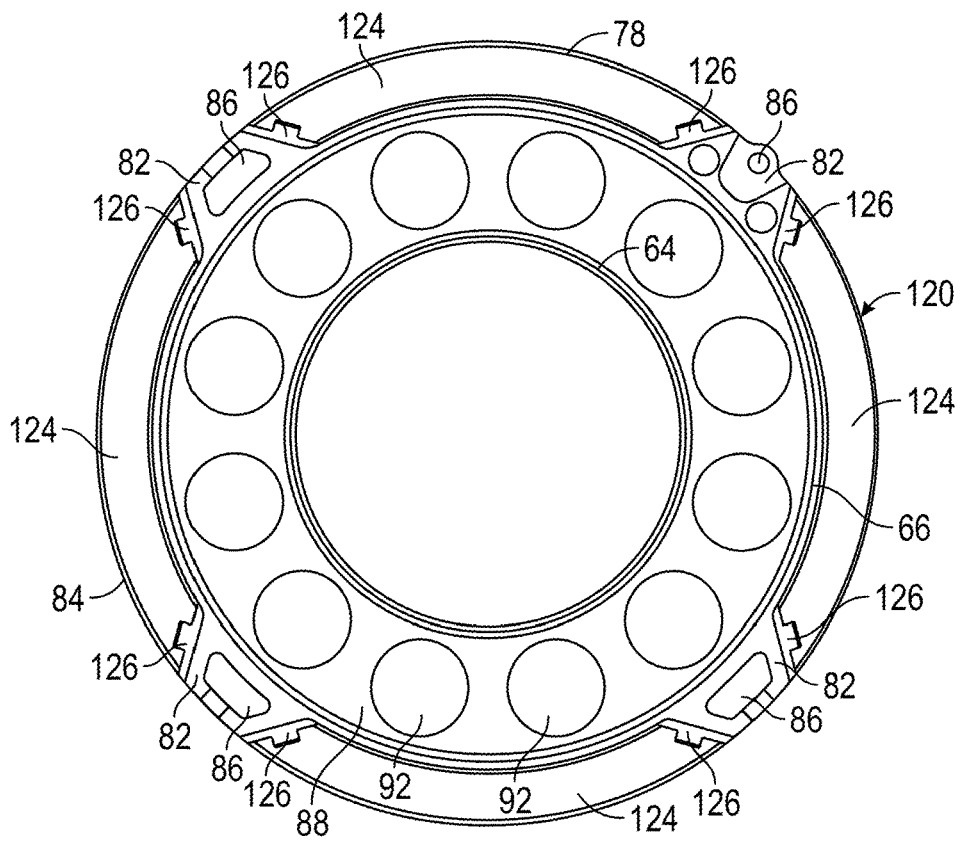
FIG. 5 is a horizontal cross-section of the swashplate of FIG. 4 taken along line M-M according to an embodiment of the invention.

Referring to FIG. 3, a blade pitch control assembly 35 includes a lower rotor control system 36 and an upper rotor control system 44. The lower rotor control system 36 includes a rotor blade pitch control horn 38 mounted for rotation with the rotor blade spindle 30 of each lower rotor blade 28. Each rotor blade pitch control horn 38 is linked to a lower swashplate 40 through a pitch control rod 42 to impart the desired pitch control thereto. The upper rotor control system 44 includes a rotor blade pitch control horn 46 mounted for rotation with the rotor blade spindle 30 of each upper rotor blade 28. Each rotor blade pitch control horn 46 is linked to an upper swashplate 48 through a pitch control rod 50 to impart desired pitch control thereto.

Each rotor system 16, 18 is independently controlled through separate swashplate assemblies 40, 48 which selectively articulates each rotor system 16. 18. Generally motion of the swashplate assemblies 40, 48 along the rotor axis A will cause the rotor blades 20 of the respective rotor system 16, 18 to vary pitch collectively, and tilting of the swashplate assemblies 40, 48 with respect to axis A will cause the rotor blades 20 to vary pitch cyclically and tilt the rotor disk. The swashplate assemblies 40, 48 translate and/or tilt by a separate servo mechanism (not shown). The upper rotor pushrods 50 are in the rotating reference system while the servos are in the non-rotating reference system which selectively articulates each rotor system 16, 18 independently in both cyclic and collective in response to a rotor control system (illustrated schematically). The rotor control system preferably communicates with a flight control system which receives pilot inputs from controls, such as a collective stick, cyclic stick, or foot pedals for example.

It should be understood that the pitch control rods and servo mechanisms for the upper rotor system 16 and the lower rotor system 18 may be located internally or externally to the respective main rotor shaft 14U, 14L and that various pitch control rods, links, and servo mechanisms at various locations for cyclic and collective pitch control of the rotor system may be utilized with the present invention.

Referring now to FIGS. 4-11, examples of a swashplate 60 configured for use with the blade pitch control assembly 35 are illustrated in more detail. The swashplate 60 includes a thin metal component 62, formed from an aluminum or titanium material for example, and a composite component 120 coupled to and received within a portion of the metal component 62. The metal component 62 is configured to provide the necessary interfacing features of the swashplate 60, such as for duplex bearing support or load input attachment for example. The composite component 120 is configured to provide additional cross-sectional area to increase the stiffness of the swashplate 60 while adding minimal weight thereto.

With respect to FIGS. 4-8, the illustrated swashplate 60 may be used as a stationary swashplate, such as swashplate 40 for example, of the lower rotor system 18 of the coaxial main rotor system 12. In the illustrated non-limiting embodiment, the metal component 62 includes a hollow inner cylinder 64 arranged within the hollow interior 68 of an outer cylinder 66. The hollow inner cylinder 64 is configured to receive a portion of a housing of the main gearbox G or a swashplate guide. The inner diameter of the outer cylinder 66 is larger than the outer diameter of the inner cylinder 64 such that a space or gap D exists between the adjacent inner wall 70 of the outer cylinder 66 and the outer wall 72 of the inner cylinder 64. In one embodiment, the gap D is designed for location of the bearing or a rotating swashplate. The overall height of the outer cylinder 66 and the inner cylinder 64 may, but need not be substantially identical.

The outer cylinder 66 includes a first flange 74 extending radially outwardly from a first end 76 of the outer cylinder 66, and a second similar flange 78 extending radially outwardly from a second, opposite end 80 of the outer cylinder 66. One or more connecting members 82 extend perpendicular to the plane of the parallel first and second flange 74, 78. The connecting members 82 couple to the first flange 74 and the second flange 78 to one another at various locations about the periphery of the outer cylinder 66. The connecting members 82 are also a metal material and may be integrally formed with any of the exterior sidewall 84 of the outer cylinder 66, the first flange 74, and the second flange 78. Although the connecting members 82 are illustrated as having a C-shape, other shapes are within the scope of the invention. As shown, each of the connecting members 82 includes at least one through hole 86 configured to receive an input, such as stationary scissors for example, of the blade pitch control assembly 35. The plurality of connecting members 82 may be substantially identical, or alternatively, may differ depending on the component configured to connect thereto.

A web 88 extends between the second end 80 of the outer cylinder 66 and an adjacent edge 90 of the inner cylinder 64 to couple the inner and outer cylinders 64, 66. In the illustrated, non-limiting embodiment of FIGS. 4-6, the web 88 is also a metal material and is integrally formed with one or both of the inner cylinder 64 and the outer cylinder 66. To minimize the weight of the swashplate 60, the metal web 88 may include a plurality of openings 92 formed therein, although such openings 92 need not be used in all aspects. The openings 92 may be substantially identical or different in size and shape, and are configured to reduce the amount of metal material in the swashplate 60 to a minimum necessary for the swashplate 60 to have a desired strength.

Figure 7:
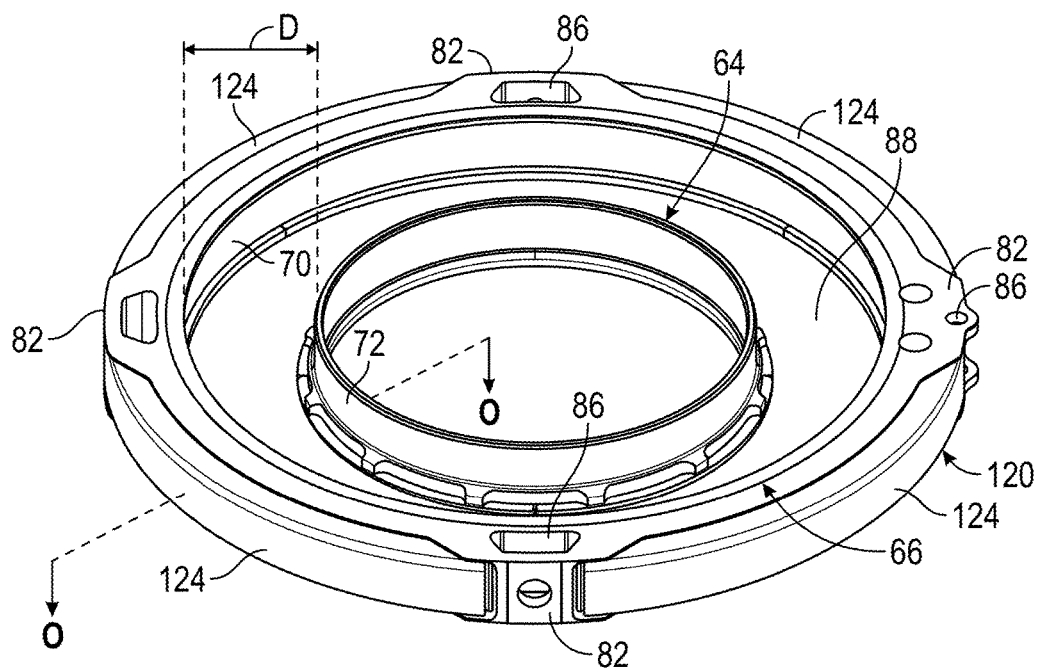
FIG. 7 is a perspective view of another swashplate of the blade pitch control assembly according to an embodiment of the invention.
Figure 8:
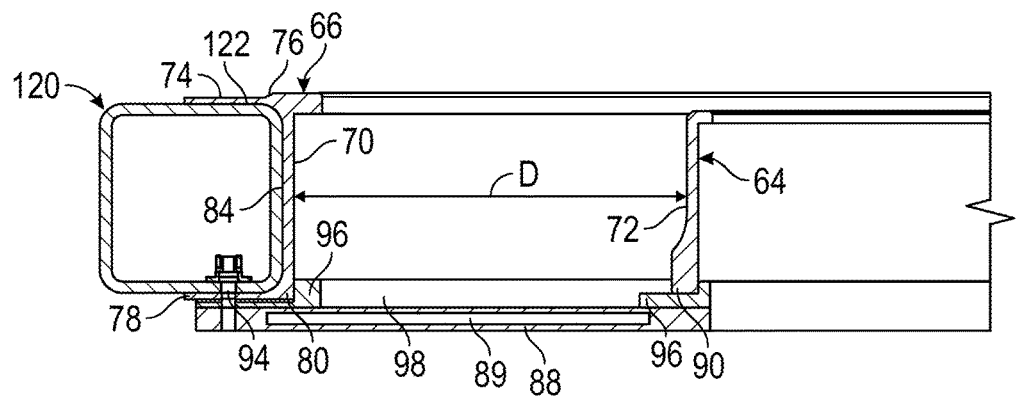
FIG. 8 is a cross-section of the swashplate of FIG. 7 taken along line O-O according to an embodiment of the invention.

In other embodiments, as shown in FIGS. 7 and 8, the web 88 may be formed from a composite material having a high stiffness and strength. As illustrated more clearly in FIG. 8, a portion 89 of the composite web 88 may include a honeycomb structure for increased rigidity. The composite web 88 may be affixed to the second end 78, 90 of the outer cylinder 66 and/or the inner cylinder 64, such as with a plurality of fasteners 94 for example. A metallic plate 96 may be arranged between the second end 78, 90 of the outer and inner cylinders 66, 64, respectively, and the composite web 88 to provide a pre-load to a bearing (not shown) configured to be received within the gap D between the inner and outer cylinders 64, 66.

Figure 9:
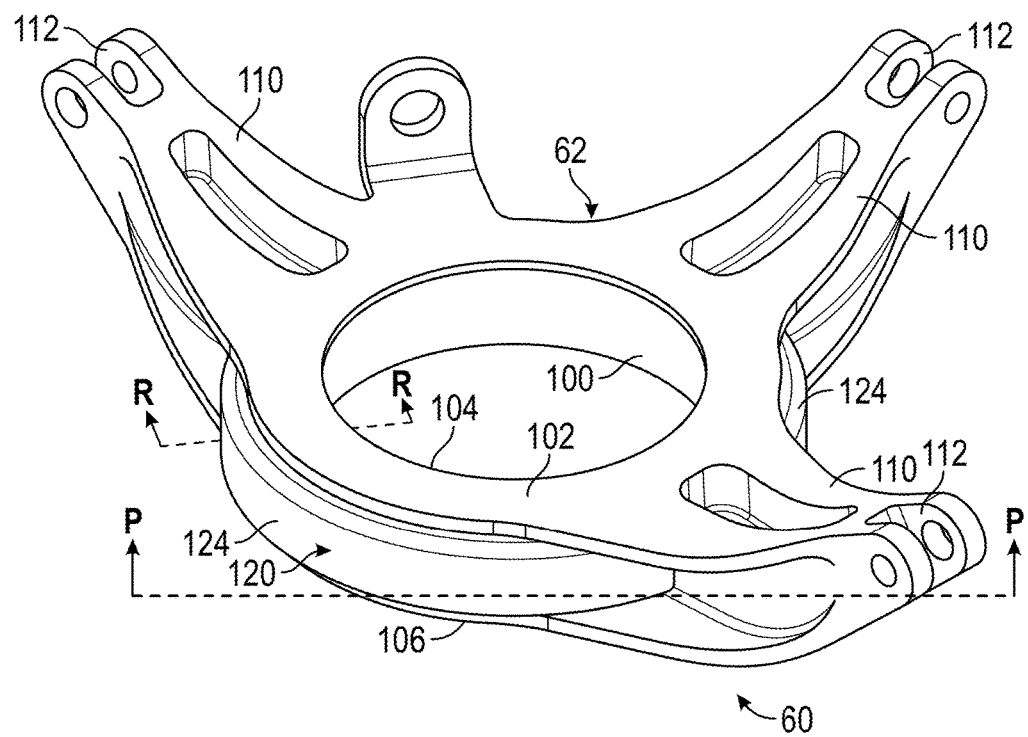
FIG. 9 is a perspective view of another swashplate of the blade pitch control assembly according to an embodiment of the invention.
Figure 10:
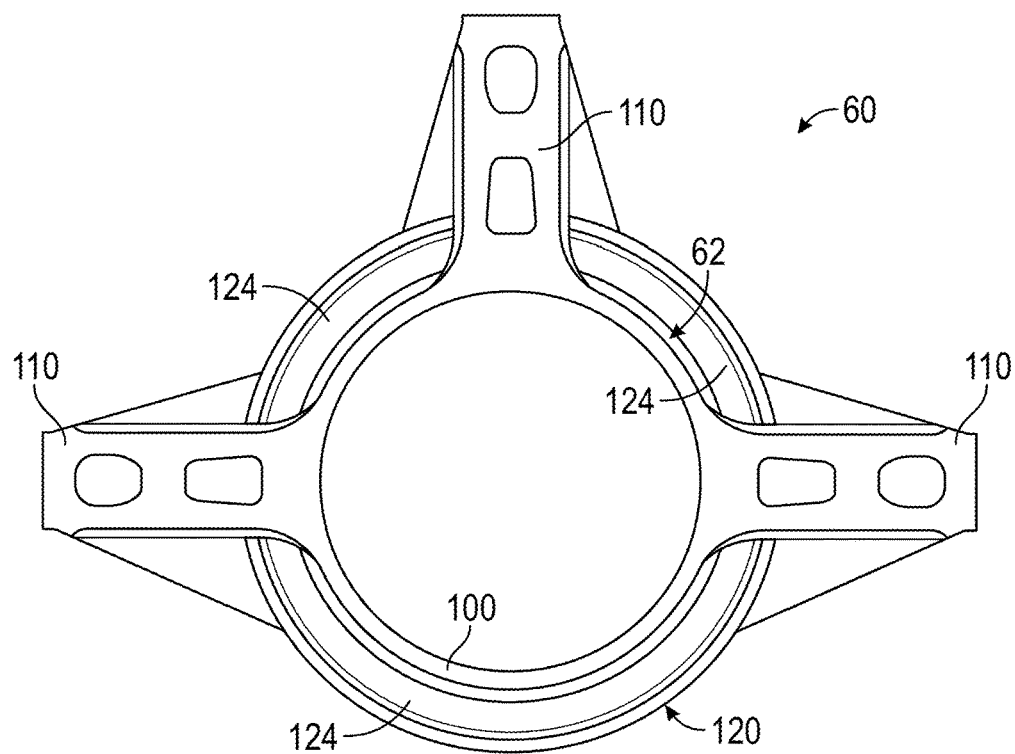
FIG. 10 is a horizontal cross-section of the swashplate of FIG. 9 taken along line P-P according to an embodiment of the invention.
Figure 11:
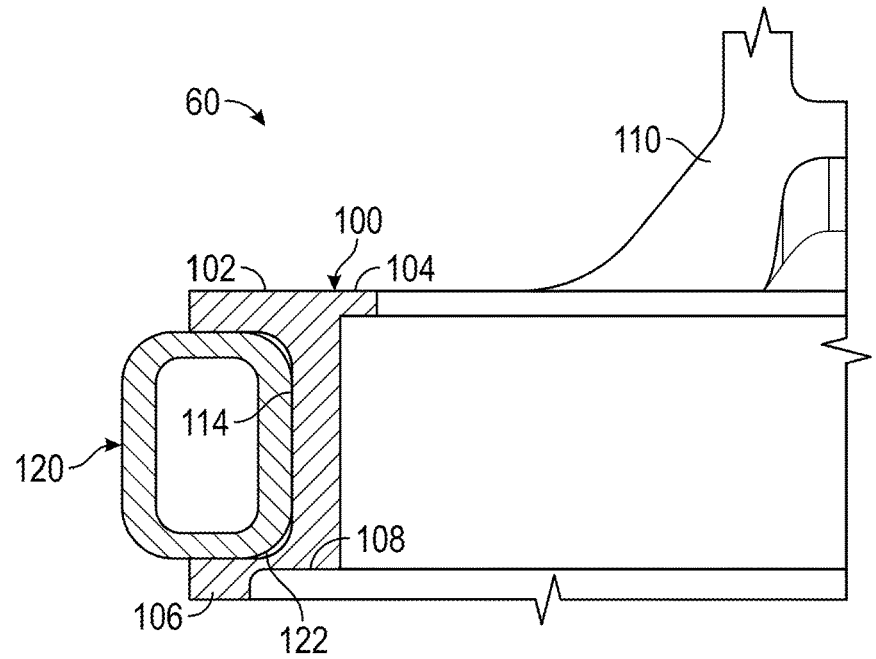
FIG. 11 is a cross-section of the swashplate of FIG. 9 taken along line R-R according to an embodiment of the invention.

Another swashplate 60 according to an embodiment of the invention is illustrated in FIGS. 9-11. The illustrated swashplate 60 may be used as a stationary swashplate, such as swashplate 48 for example, configured for use with an upper rotor of a coaxial main rotor system 12. In the illustrated, non-limiting embodiment, the metal component 62 includes a hollow cylinder 100 configured to receive a duplex bearing and rotating swashplate (not shown). Cylinder 100 includes a first flange 102 extending from a first end 104 thereof and a second flange 106 extending from a second, opposite end 108 thereof.

Similar to the previous embodiment shown in FIGS. 7 and 8, a plurality of connecting members 110 couple the first flange 102 and the second flange 106. As shown, the connecting members 110 may extend outwardly and at an angle from the perimeter of the cylinder 100. The size and contour of the connecting members 110 may be selected to minimize excess metal material while providing the necessary shape and strength. As shown, each of the connecting members 110 includes at least one through hole 112 configured to receive an input, for example a servo, of the blade pitch control assembly 35. As previously described, the plurality of connecting members 112 may be substantially identical, or alternatively, may differ depending on the component configured to connect thereto.

With reference to the embodiments in FIGS. 4-11, the composite component 120 of the swashplate 60 is generally tubular in shape and is formed from one or more layers, for example of fiberglass or graphite plies. In one embodiment, the layers of the composite component 120 are woven together, however, other constructions of the composite component 120 are within the scope of the invention.

Figure 6:
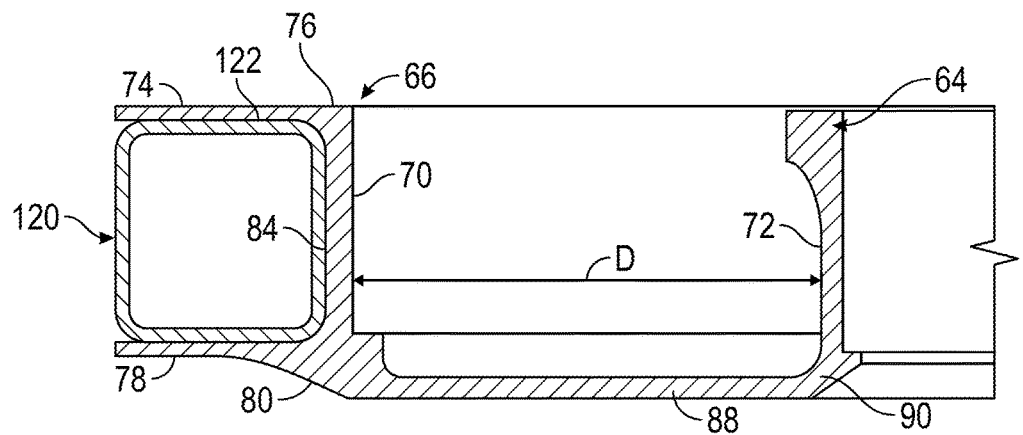
FIG. 6 is a cross-section of the swashplate of FIG. 4 taken along line N-N according to an embodiment of the invention.

The composite component 120 is positioned at least partially within the cavity formed between the first flange and the second flange of the metal component. For example, with respect to FIGS. 4-8, a cavity 122 is formed between the exterior sidewall 84 of the outer cylinder 66 and the first and second flanges 74, 78. In FIGS. 9-11, a cavity 122 is defined between the first flange 102, the second flange 106, and the exterior sidewall 114 of the cylinder 100. The composite component 120 may have a width substantially equal to the cavity 122, as shown in FIG. 6, or alternatively, may have a width larger than the cavity 122 (see FIGS. 8 and 11) such that a portion of the composite component 120 extends outwardly beyond the adjacent flanges. In the illustrated, non-limiting embodiments, the composite component 120 has a generally square or cross-sectional shape; however, a composite component 120 having a cross-section of another shape, such as circular, oval, or triangular, or polygonal shape are within the scope of the invention. The composite component 120 may be attached to the metal component 62 of the swashplate 60 such as via bonding, and or via a plurality of fasteners (not shown) for example.

As shown, the composite component 120 includes a plurality of sections 124. Each section 124 is configured to mount between adjacent connecting members 82, 112 of the metal component 62. In one embodiment, best shown in FIG. 5, the swashplate includes a plurality of connectors 126 complementary to the ends of each composite section 124 such that the connectors 126 function as an end cap for the tubular composite sections 124. Though the embodiment of FIGS. 4-8 includes four sections 124, and the embodiment of FIGS. 9-11 includes three sections 124, the composite component 120 may be formed into any number of sections. In addition, the plurality of sections 124 may be substantially similar as in FIGS. 4-8, or may differ, as in FIGS. 9-11.

By reinforcing the swashplate 60 with a composite component 120, the stiffness of the swashplate 60 is significantly increased with minimum added weight. In addition, the composite sections 124 are easier to manufacture than a complex single piece metallic swashplate.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, while described in the context of a stationary swashplate, it is understood that aspects could be used in a rotating swashplate. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A swashplate of a blade pitch control assembly comprising:
   a metal component including:
      a hollow first cylinder having a first flange extending outwardly from a first end thereof, a second flange extending outwardly from a second end thereof, and a sidewall extending between the first and second flanges such that a cavity is defined between the first flange, the second flange, and the sidewall; and
      a plurality of connecting members connecting a portion of the first flange and the second flange, the plurality of connecting members being spaced about a periphery of the first cylinder; and
   a tubular composite component arranged at least partially within the cavity and connecting adjacent pairs of the connecting members.

2. The swashplate of claim 1, wherein the swashplate is stationary.

3. The swashplate of claim 1, wherein the swashplate is configured to couple to a rotor shaft rotatable about an axis, and the swashplate rotates with the rotor shaft about the axis.

4. The swashplate of claim 1, wherein the composite component includes one or more layers of fiberglass or graphite fibers.

5. The swashplate of claim 1, wherein the composite component includes a plurality of separate sections, each section being mounted between adjacent connecting members.

6. The swashplate of claim 5, wherein the plurality of sections of the composite component are identical.

7. The swashplate of claim 5, wherein at least one section of the plurality of sections is different from a remainder of the plurality of sections.

8. The swashplate of claim 1, wherein the composite component has a rectangular cross-section.

9. The swashplate of claim 1, wherein a hollow interior of the first cylinder is configured to receive a rotatable shaft therein.

10. The swashplate of claim 1, wherein the plurality of connecting members extend outwardly from the first cylinder at an angle.

11. The swashplate according to claim 1, wherein the metal component further comprises a hollow second cylinder arranged concentrically within a hollow interior of the first cylinder, the second cylinder having an outer diameter smaller than an inner diameter of the first cylinder such that a gap is defined between the second cylinder and the first cylinder.

12. The swashplate according to claim 11, wherein a web extends between the second end of the first cylinder and an adjacent end of the second cylinder.

13. The swashplate according to claim 12, wherein the web is integrally formed with one or both of the second flange of the first cylinder and the adjacent end of the second cylinder, the web being formed from a metal material.

14. The swashplate according to claim 12, wherein the web comprises a composite material.

15. A rotary wing aircraft, comprising:
   a main rotor system including a rotor shaft configured to rotate about an axis, a rotor hub having a plurality of rotor blades mounted thereto is connected to the rotor shaft and is configured to rotate therewith; and
   a blade pitch control assembly configured to move each of the plurality of rotor blades about a pitch axis, the blade pitch control assembly having a swashplate linked to the main rotor system, the swashplate including:
      a metal component having one or more interfacing features, the metal component including:
         a hollow first cylinder having a first flange extending outwardly from a first end thereof, a second flange extending outwardly from a second end thereof, and a sidewall extending between the first and second flanges such that a cavity is defined between the first flange, the second flange, and the sidewall; and
         a plurality of connecting members connecting a portion of the first flange and the second flange, the plurality of connecting members being spaced about a periphery of the first cylinder; and
      a tubular composite component arranged at least partially within the cavity and connecting adjacent pairs of the connecting members.

* * * * *